March 25, 1969
M. J. CELOVSKY
3,435,174
ELECTRICAL DISCHARGE MACHINING APPARATUS
DIES AND ROLL MANUFACTURE
Filed Sept. 13, 1965
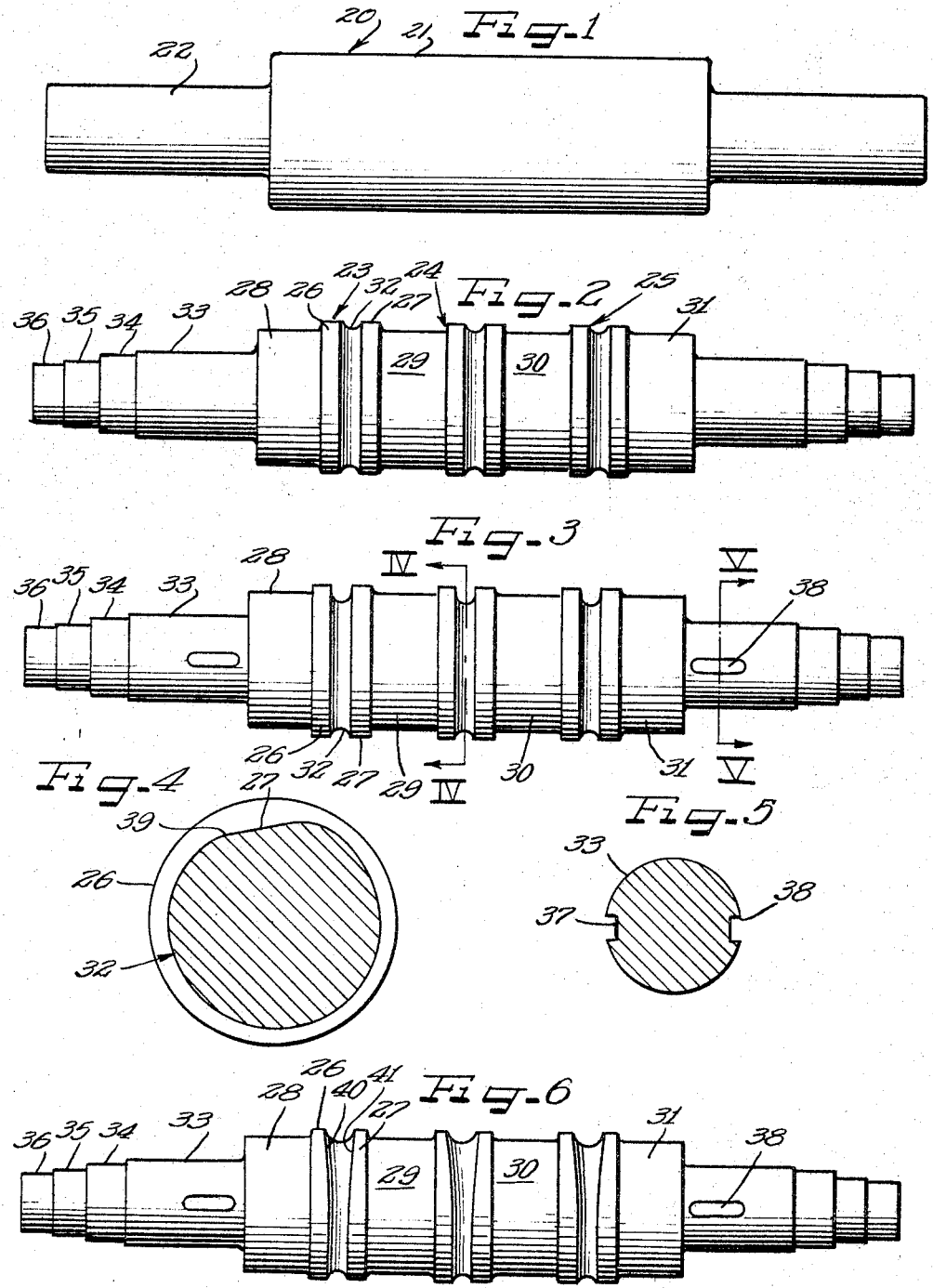
INVENTOR.
Michael J. Celovsky
ATTORNEYS

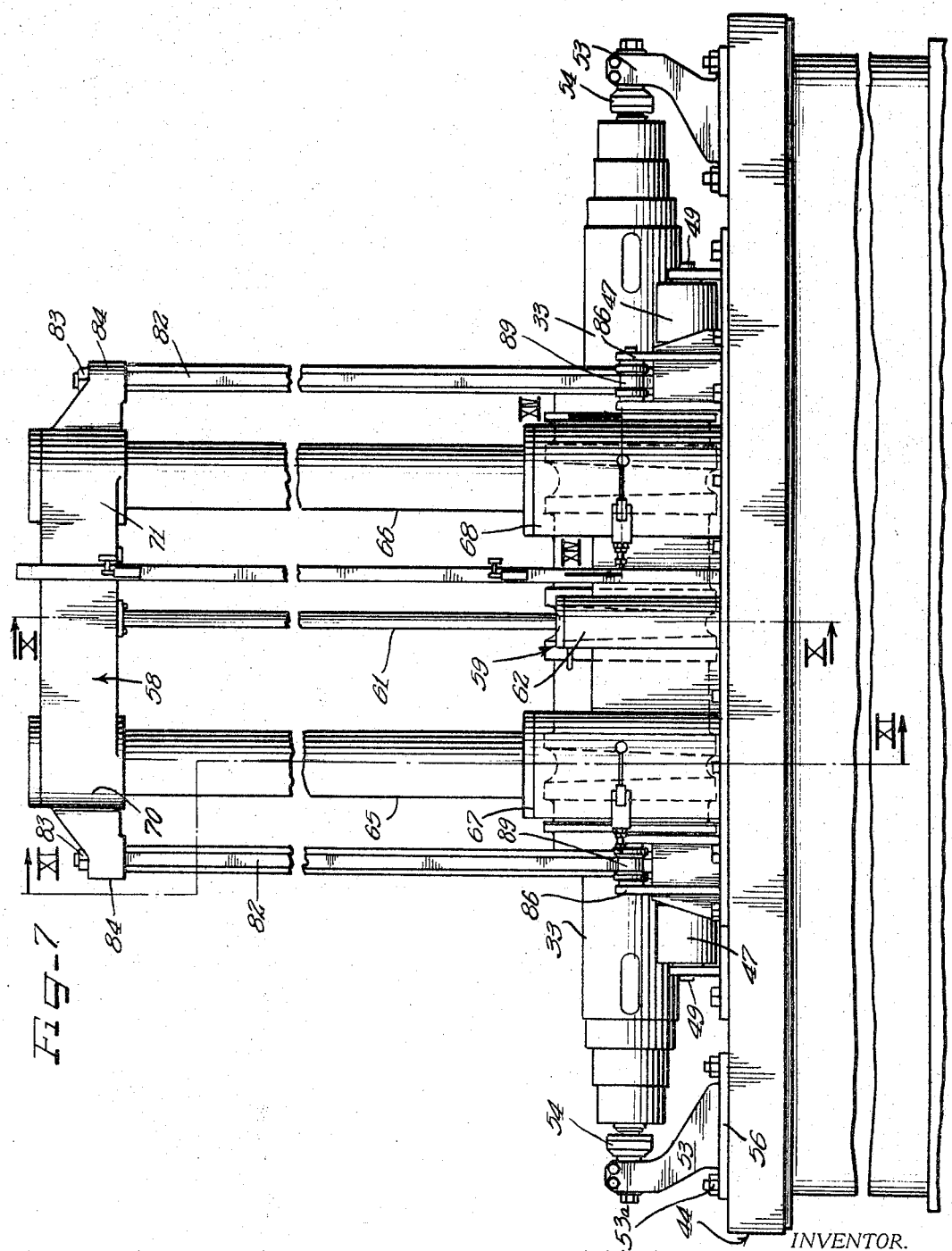

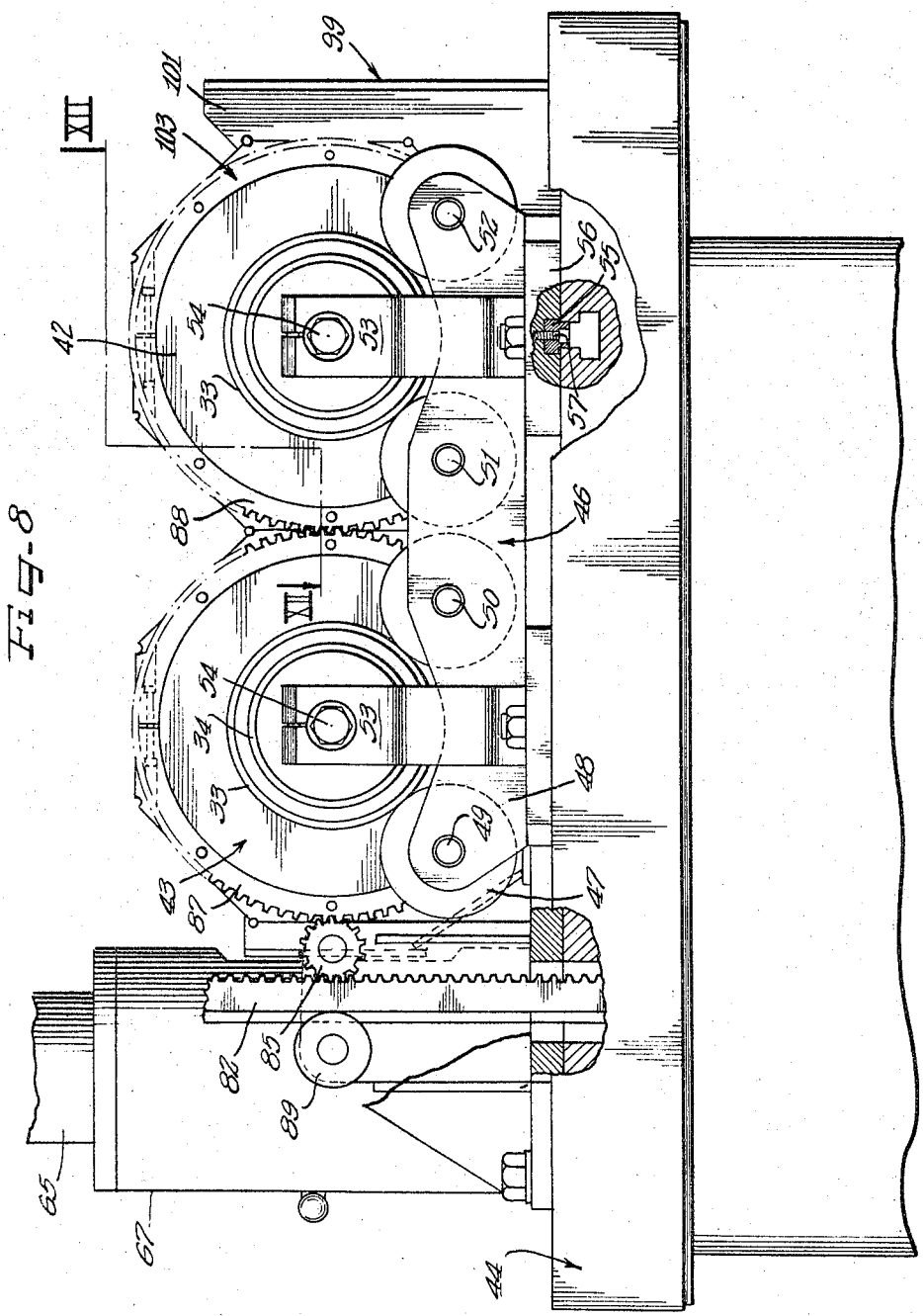

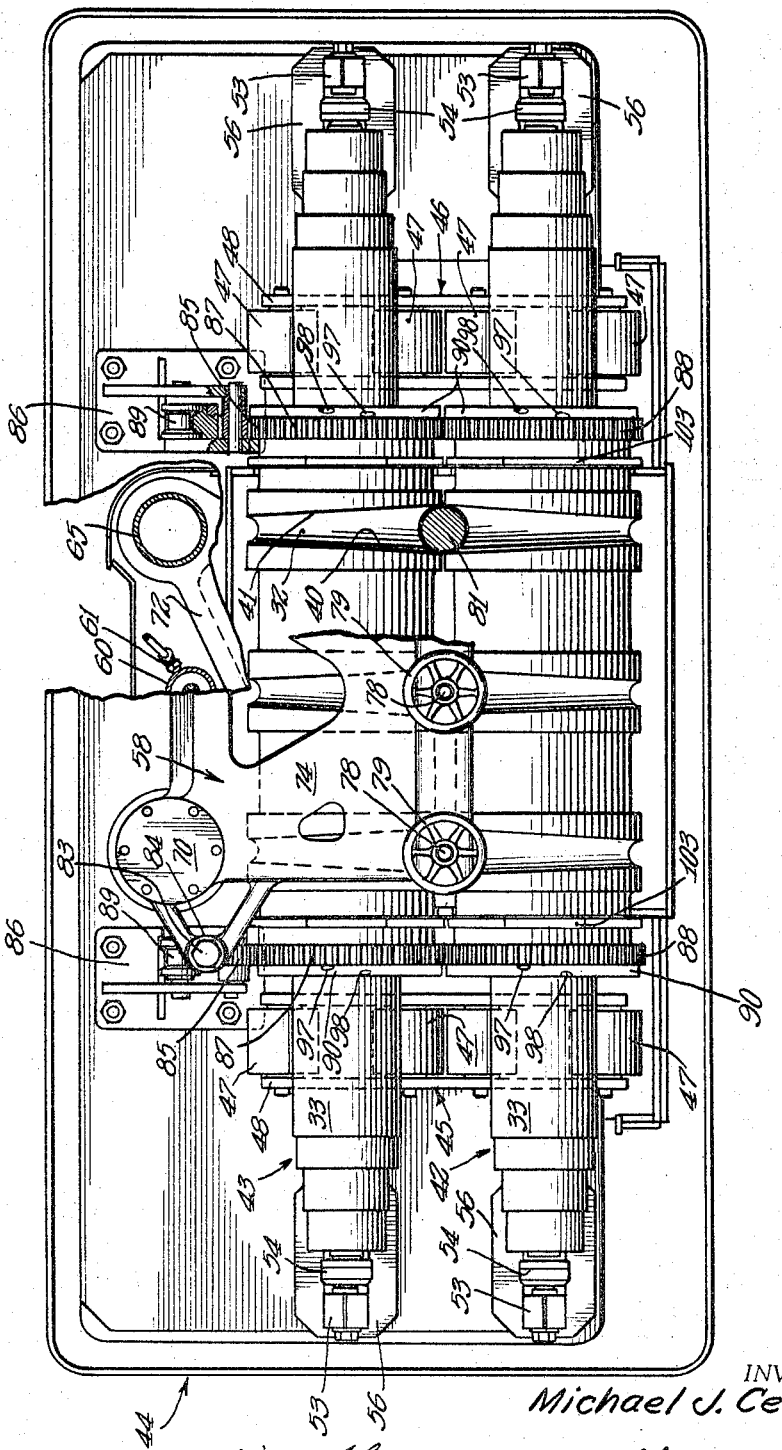

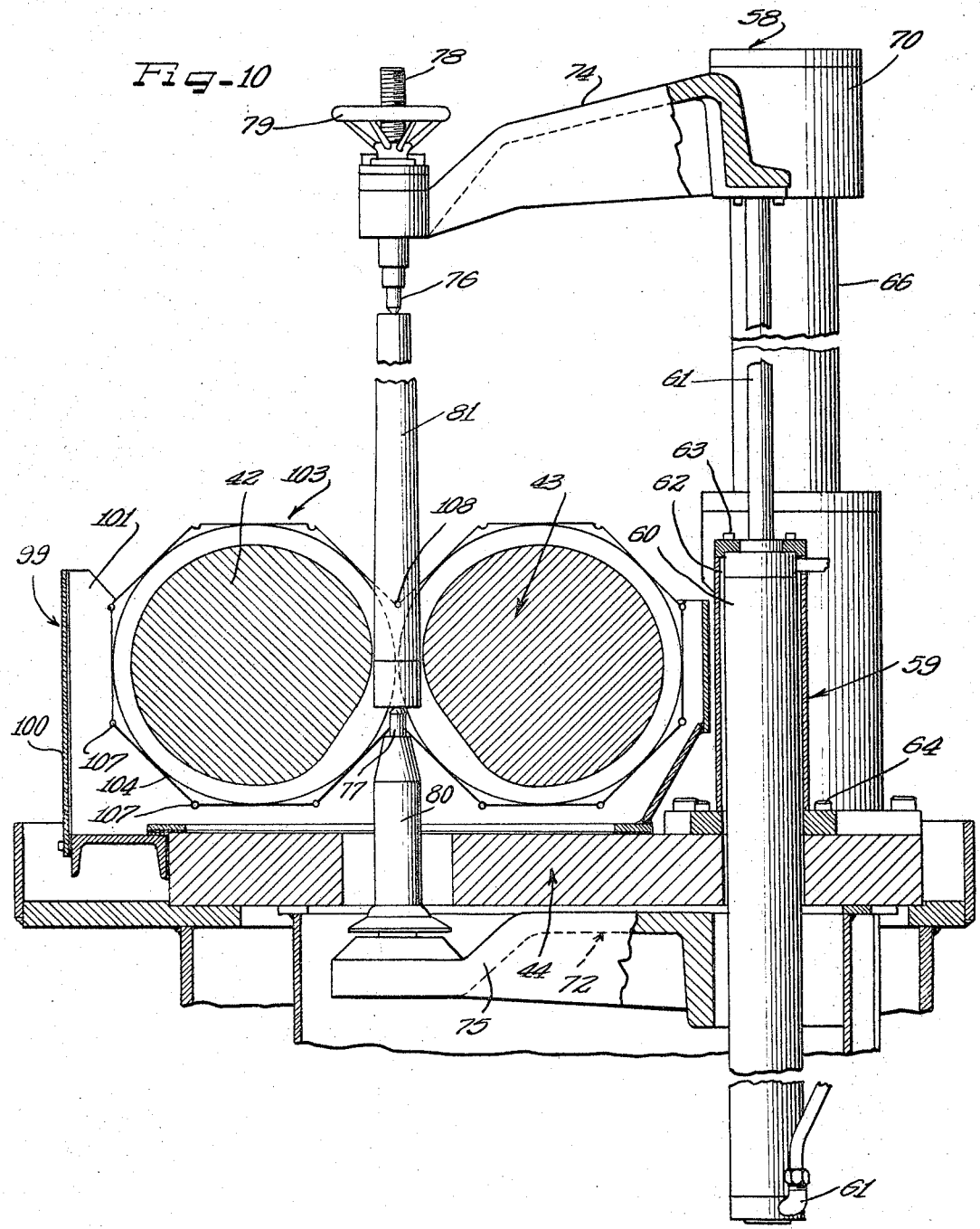

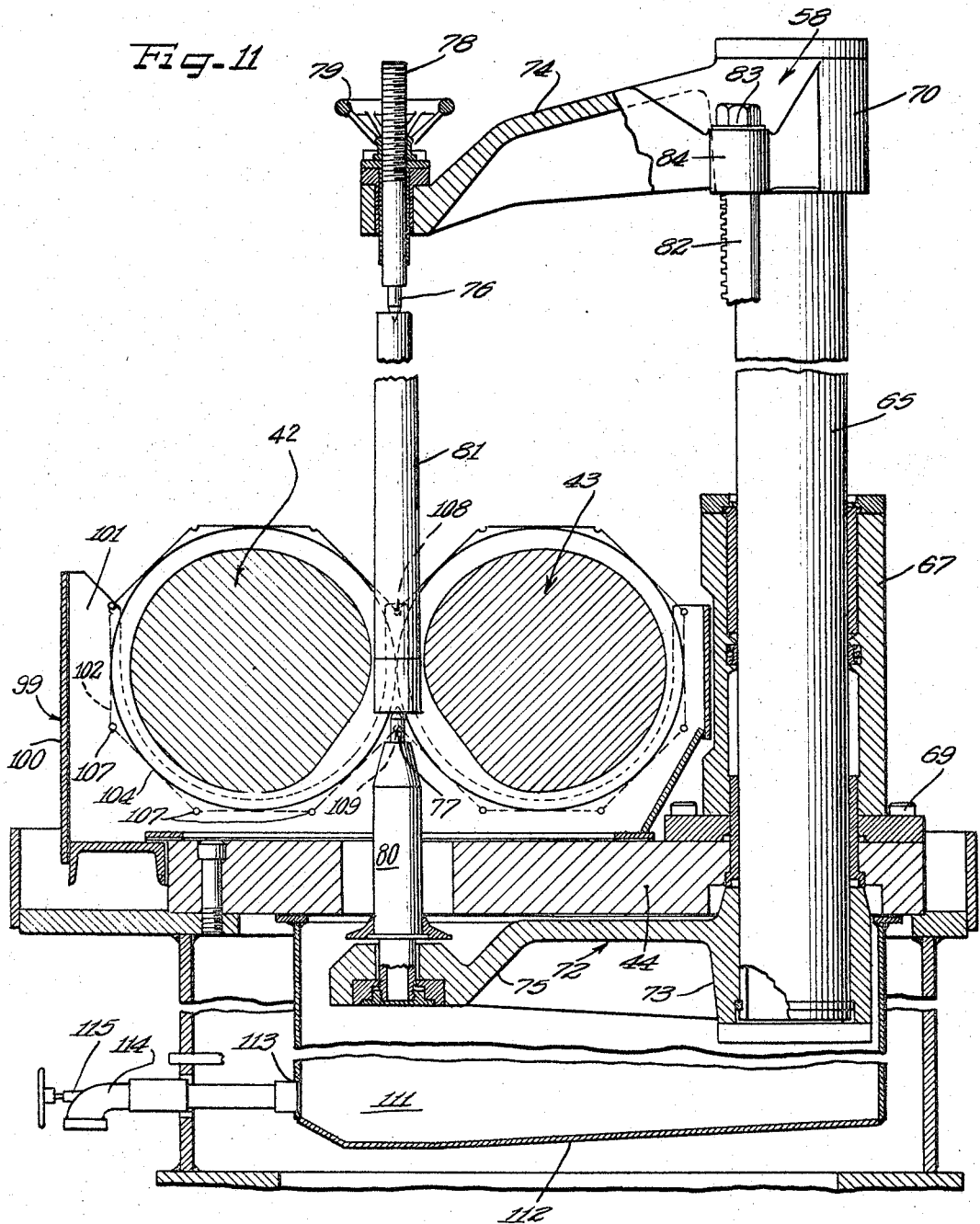

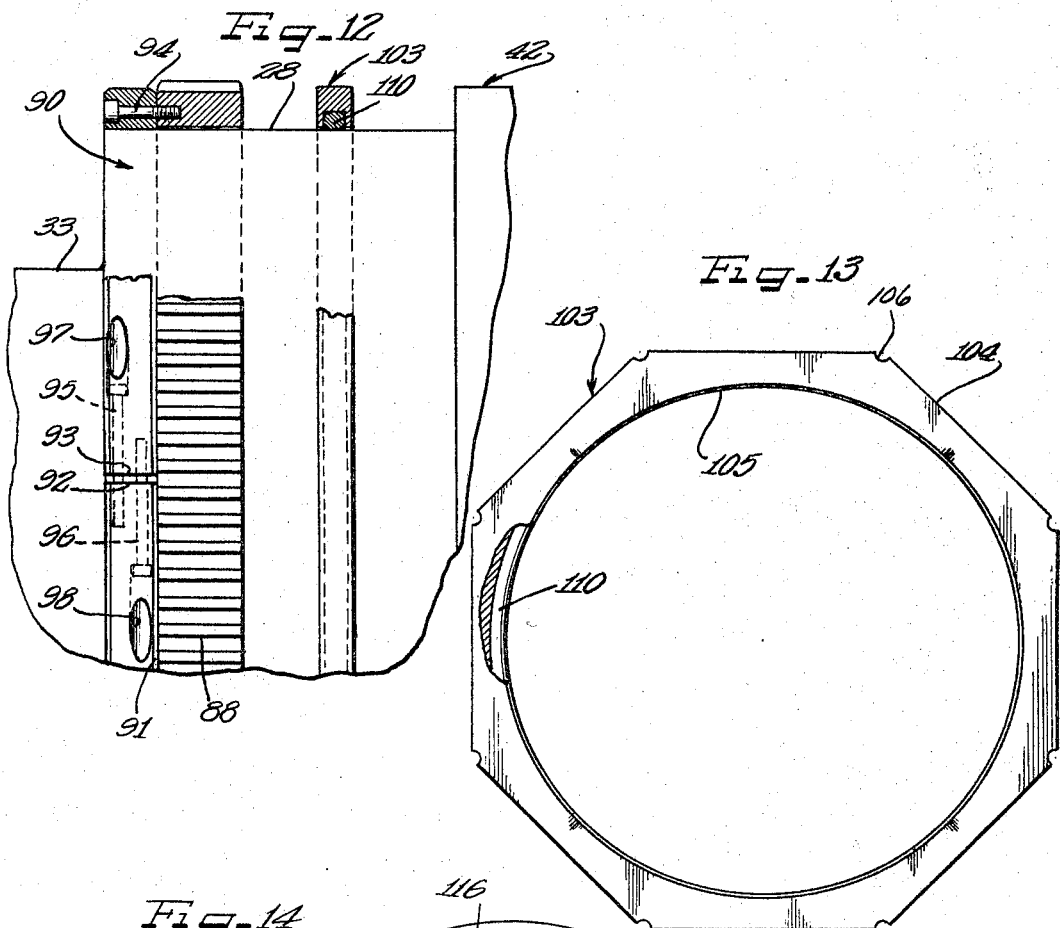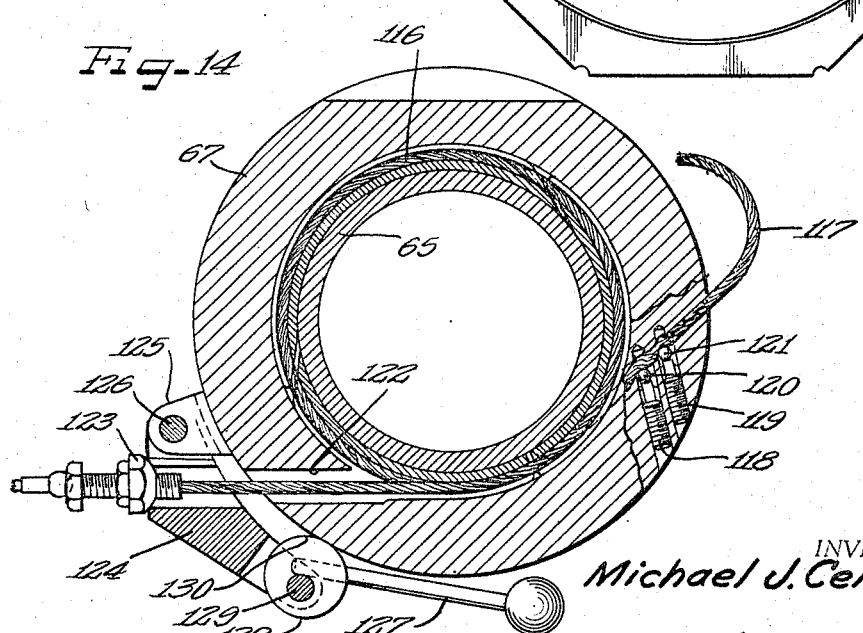

United States Patent Office 3,435,174
Patented Mar. 25, 1969

3,435,174
ELECTRICAL DISCHARGE MACHINING APPARATUS DIES AND ROLL MANUFACTURE
Michael J. Celovsky, Detroit, Mich., assignor to Industrial Tool Engineering Company, Detroit, Mich., a corporation of Michigan
Filed Sept. 13, 1965, Ser. No. 486,652
Int. Cl. B23p 1/02; F16c 35/06
U.S. Cl. 219—69         19 Claims

ABSTRACT OF THE DISCLOSURE

An electrical discharge machining apparatus and method for forming a series of rolls on a pair of shafts. A pair of shafts are orientated parallel to one another and are mounted in a fluid bath in preparation for the electrical discharge machining operation. A carriage is disposed adjacent to the shafts and has a series of tapered electrodes disposed in a line parallel to the axis of the shafts. The shafts are rotated by an appropriate gear mechanism as the tapered electrodes are lowered to a point intermediate the confronting rolls of the shafts.

---

This invention relates to a device for electrically machining heat treated or hardened metals and in particular to a device for tapering arcuate grooves in a tube reducing roll after the final heat treating process.

Recently, means have been developed for electrically machining tube reducing rolls to a high finish by passing an energized electrode adjacent to the moving surfaces of a rotating roll and utilizing the erosive effect of the resulting electrical discharge.

While direct electrical machining has appreciably improved the efficiency of prior hand finishing methods, devices currently used for this purpose have not been entirely satisfactory. For instance, heretofore machines have been equipped for machining a single set of tube reducing rolls. The machining process consists of passing a tapered electrode into the path of synchronously rotating rolls for the purpose of conforming roll grooves to the configuration of the electrode. The electrical erosion relied upon to achieve this objective is a comparatively slow process. Therefore, it would be highly desirable to construct an apparatus for machining several sets of rolls during a single synchronous stroke of the machine.

Also, the manner of mounting the individual rolls for machining has been found to be time consuming and to involve unnecessary cost. Previously individual rolls have been provided with a central bore for being mounted on a shaft or spindle of the electrical discharge machine. This form of mounting has been necessitated by the requirement that the spindle of the electrical discharge machine be permanently geared to the movement of the associated tapered electrodes. Nevertheless, it has been recognized that providing a device for finish machining an integral roll and shaft combination would be highly desirable.

Accordingly, it is a principal object of the present invention to provide a device for electrical discharge machining a plurality of tube reducing rolls during a single, synchronous stroke of the electrode cutters.

It is also an object of this invention to provide a device for finish machining a tube reducing roll which is formed integrally with a drive shaft or spindle.

It is another object of this invention to provide a device for finish machining tube reducing rolls and which employs a readily removable gearing means for synchronizing shaft rotation to electrode movement.

It is a further object of this invention to provide a new and improved tube reducing tool having a plurality of tapered rolls formed integrally with a drive shaft or spindle.

It is an additional object of this invention to provide a novel fluid bath structure for use in conjunction with an electrode finish machining device employed for tapering a plurality of rolls formed integrally with a drive shaft.

It is another object of this invention to provide an improved roller support means for positioning roll shafts on an electrode cutting device.

It is also an object of this invention to provide a device for finish machining a tube reducing roll having a plurality of tapered electrodes and employing a novel locking means for directly restricting the progression of the electrodes during a machining operation.

These and other objects, features and advantages of the present invention will be understood in greater detail from the following description and the associated drawings wherein reference numerals are utilized in designating a preferred embodiment and wherein:

FIGURE 1 is an elevated view of a roll and spindle blank utilized in forming the tube reducing tool of the present invention;

FIGURE 2 is also an elevational view showing an intermediate stage in the production of the tube reducing tool of this invention;

FIGURE 3 is a view similar to that shown in FIGURE 2 incorporating the additional features of machined keyways and relief pockets;

FIGURE 4 is a sectional view taken along the line IV—IV of FIGURE 3 illustrating the geometry of the relief pocket utilized in the tube reducing tool of this invention;

FIGURE 5 is a further sectional view taken along the lines V—V of FIGURE 3 and showing the relationship of the diametrically opposed keyways as employed in the tool of this invention;

FIGURE 6 is an elevational view of the tube reducing tool of this invention after the final machining process to be described herein;

FIGURE 7 is a rear elevational view of the electrode machining device of this invention emphasizing the electrode carriage structure and the longitudinal orientation of the tube reducing tool as shown in FIGURE 6;

FIGURE 8 is a enlarged end view of the electrode machining device of this invention illustrating the novel roller support means for the tube reducing tool shown in FIGURE 6 and also illustrating the geared relationship between the electrode carriage structure and the rotating roll spindles;

FIGURE 9 is a top view of the electrode machining device of this invention illustrating the functioning of the plural electrode structure in penetrating the tapering grooves of adjacently disposed tube reducing rolls;

FIGURE 10 is a sectional view of the electrode machining device of this invention as taken along the lines X—X of FIGURE 7 illustrating the relationship of the hydraulic carriage mechanism and the supporting structure for the tapered electrodes as well as the configuration of the fluid bath tank;

FIGURE 11 is a further sectional view of the electrode machining device of this invention as taken along the lines XI—XI of FIGURE 7 illustrating the carriage structure and the oil reservoir system;

FIGURE 12 is a partially sectioned view as taken along the lines XII—XII of FIGURE 8 for illustrating the structure and function of the readily removable gearing means employed for driving the tube reducing shaft of this invention;

FIGURE 13 shows an octagonal seal ring utilized in conjunction with the fluid bath of this invention and further indicated in FIGURES 10 and 11; and FIGURE 14 is a sectional view taken along the lines XIV—XIV of FIGURE 7 showing the operation of the novel locking mechanism as applied to the carriage structure of this invention.

As shown on the drawings:

The sequence of manufacturing operations for a preferred embodiment of this invention is shown generally in FIGURES 1 through 6. In FIGURE 1 a blank 20 is provided with a roll portion 21 and drive shaft or spindle portion 22. The roll portion 21 is rough machined to define a series of rolls 23, 24 and 25. The rolls 23, 24 and 25 consist of pairs of collars or ridges 26 and 27 extending above radially reduced regions 28, 29, 30 and 31. A rough machined arcuate groove 32 is formed between the ridges 26 and 27 and provides the principal tube reducing surface. The shaft or spindle 22 is similarly machined and is provided with a series of decreasing diameters 33, 34, 35 and 36 for meeting various functional requirements of a tube reducing machine.

After completion of the machining processes indicated in FIGURE 2, the tube reducing tool is provided with keyways 37 and 38, as shown in FIGURES 3 and 5, and relief pocket 39 illustrated in FIGURE 4. Finally, the tube reducing tool is finish machined by the electrode machining device of this invention. The result is shown in FIGURE 6 and takes the form of tapered walls 40 and 41 provided at the inner surface of the grooves 32. The tapered walls 40 and 41 allow for the gradual compressing of a reducible tube as is well understood in the art.

FIGURES 7 through 14 illustrate various features of the electrode cutting machine of this invention, and, in particular, FIGURES 7, 8 and 9 collectively illustrate the mounting of the tube reducing tools on the machine structure.

Referring to FIGURES 7, 8 and 9, tube reducing shafts 42 and 43 are deployed in side-by-side relationship on a bed 44 of the electrode cutting machine.

The shafts 42 and 43 are supported on sets of rollers 45 and 46 disposed at opposite ends of the bed 44. The roller sets 45 and 46 consist of cylindrical rollers 47 freely mounted for rotation at a vertical supporting fixture 48. As in FIGURE 8, the rollers 47 are rotatably supported at points 49, 50, 51 and 52 on the bracket 48 so as to provide correct spacing of the shafts 42 and 43 carried thereon.

While the spacing between the shafts 42 and 43 is provided by the positioning of the roller sets 45 and 46, the axial alignment of the shafts and hence of the individual rolls is accomplished by end fixtures 53 which are bolted to the bed 44 as at 53a. The fixtures 43 are provided with an axially adjustable guide arm 54 for establishing the desired orientation of the associated shaft. Fine adjustment of the end fixture 53 is accomplished through the use of an eccentric plug 55 which interconnects the base 56 of the fixture 53 and the body of the bed 44. By turning a screw 57 the relative positioning of the fixture 53 and the bed 44 can be altered, as is well understood.

With the shafts 42 and 43 properly mounted on the bed 44, means must be provided for passing an electrode within the grooves 32 and for synchronously rotating the associated shafts for tapering the individual rolls in accordance with the requirements of tube reducing machines.

To produce proper movement of the electrode cutters a hydraulically operated carriage system is provided at the rear of the bed 44. The carriage system consists of a carriage head 58 supported and operated by a conventional hydraulic mechanism 59. The hydraulic mechanism 59 consists of a hydraulic cylinder 60 and a relatively extensible power member 61. Fluid pressure is applied to the cylinder 60 through a pressure inlet 61 conducting from a fluid pump or the like. Fluid pressure within the cylinder 60 acts on a piston attached to the extensible rod 61 for raising or lowering the carriage head 58 in accordance with the demands of the fluid control system. The cylinder 60 is mounted to the bed 44 through the provision for an outer housing 52. In particular, the cylinder 60 is secured to the housing 62. In particular, the cylinder 60 is secured to the housing 62 at a plurality of bolts 63, while the housing 62 is mounted to the bed 44 by fasteners 64. In a similar manner the upper extremity of the rod 61 is secured to the carriage head 58.

The carriage head 58 is principally supported by the relatively extensible rod 61. However, similarly extensible guide columns 65 and 66 provide stability to the movement of the carriage assembly. The guide columns 65 and 66 are slidably received within cylindrical supports 67 and 68, which are in turn fixedly secured to the bed 44 at a plurality of lugs 69. The carriage head 58 is received about the upper extremity of the columns 65 and 66 within cylindrical casings 70 and 71. Similarly, a carriage base 72 is provided with cylindrical casings as shown at 73 which are fixedly mounted about the lower extremity of the columns 65 and 66. Therefore, the movement of the relatively extensible hydraulic rod 60 operates the assembly of the guide columns 65 and 66 and their associated head and base 58 and 72, respectively.

A principal function of the carriage assembly is to pass a series of electrodes between the shafts 42 and 43 for tapering the roll grooves 32. To accomplish this purpose the carriage unit is provided with upper and lower cantilever arms 74 and 75 for supporting electrode pins 76 and 77. The pin 76 is formed integrally with a threaded stud 78 which is mounted to the cantilever arm 74 for being axially adjustable by rotation of the positioning wheel 79. In contrast, the pin 77 is affixed to a shaft 80 which is mounted to the lower cantilever arm 75 in a suitable manner for being substantially axially stationary.

A series of tapered electrodes 81 are securely positioned between the pins 76 and 77 by the tightening of the wheel 79. It is appreciated, therefore, that the electrodes 81 will be caused to move in a vertical path with the carriage assembly according to the dictates of the hydraulic mechanism 59. It is this movement of the electrodes 81 that performs the electrical machining action desired by this invention.

To produce a tapered groove due to the vertical motion of the tapered electrodes 81 the shafts 42 and 43 must rotate into the path of the descending or ascending electrodes. Furthermore, this rotation must be synchronized to the movement of the shaft in order to produce the desired consistent taper within the grooves 32.

Synchronization is accomplished by gearing the upward or downward progression of the carriage assembly directly to the shafts as seated on the support rollers 47. Three gearing elements are utilized to accomplish this objective. First, a rack gear 82 is fixedly mounted via a bolt 83 within a cooperable casing 84 formed integrally with the carriage head 58. Second, a pinion gear 85 is rotatably mounted on a support bracket 86 which in turn is rigidly secured about the adjacent shaft 42.

As shown in FIGURE 8, vertical motion of the carriage assembly and, therefore, of the rack gear 82 will be converted to a rotary motion through the pinion 85 to the ring gears 87 and 88 and hence to the shafts 42 and 43. It may be noted that the rack gear 82 is maintained in mesh with the pinion 85 during its vertical progression by a guide wheel 89 rotatably mounted on the fixture 86 which also supports the pinion 85. It can be understood, therefore, that the shafts 42 and 43 through the provision for the interlocking gearing system are positionally related to the progression of the carriage assembly, which is the desired consequence for producing the tapered grooves of the tube reducing rolls.

Since the tube reducing roll as shown in FIGURE 6 comprises a plurality of rolls which are mounted on an integral shaft, the ring gears 87 and 88 must be applied to each set of shafts to be finish machined.

To improve the efficiency of the application of the ring gears to the shafts 42 and 43 a novel gearing assembly has been employed in this electrode cutting machine. In particular, FIGURE 12 shows a cutaway portion of the ring gear assembly as indicated in FIGURE 8. The ring gear 88 is provided to be slidably received over the shaft 42 at the diameter 28 and a split ring 90 is likewise slipped over the shaft 42 for abutting the edge 91 of the gear 88. The split ring 90 is separable at faces 92 and 93 and, therefore, is easily expandable about the shaft surface 28. With the ring gear 88 and the split ring 90 in abutment thereto, the ring 90 is fixedly secured to the gear 88 by a plurality of peripheral bolts 94. Finally, the assembled unit of the split ring and ring gear are bound to the shaft 42 by constricting the split ring about the surface 28. This constriction is accomplished by tightening a pair of screws 95 and 96 which cooperatively close the gap between the opened edges 92 and 93. The screws 95 and 96 may be adjusted by a standard screwdriver or similar applicable wrench through the openings 97 and 98. Through this provision for readily removable gearing, the shafts 42 and 43 remain untouched and the machine set-up time is significantly reduced.

To accomplish the electrical machining of the grooves 32 associated with the rolls of the shafts 42 and 43 a continuous fluid bath must be provided about the electrical cutting surfaces. A tank is provided centrally of the bed 44 to engulf the cutting regions of the shafts 42 and 43. The oil tank 99 is provided with longitudinal side walls 100 and end wall 101. The end walls 101 have shaft openings 102 which permit the extension of the shafts to points externally of the oil tank where support and rotation can be more adequately applied.

To assure a steady supply of oil to the cutting surfaces an oil seal must be mounted about the shafts 42 and 43. This seal takes the form of a ring 103 shown in FIGURE 13 as having an octagonal outer periphery 104 and a circular inner diameter 105. The octagonal outer surface 104 is provided with radial notches 106 as a means of fastening the ring 103 to the end wall 101 of the oil tank 99. The shaft opening 102 of the end wall 101 has a configuration which is complementary to the octagonal outer periphery of the ring 103.

As shown in FIGURES 10 and 11 a pair of seal rings 103 may be fitted within the complementary shaft openings 102 to provide a tight and effective seal for the tank 99. In particular, the seal ring 103 is fastened to the end wall 101 at a plurality of points 107 and to each other at the points 108 and 109. To provide an effective seal between the end wall 103 and the rotating shafts 42 and 43, an O-ring 110 is fitted at the inner surface of the seal 103, and is shown in both FIGURES 12 and 13.

As shown in FIGURE 11, the oil tank 99 is communicable with a lower chamber 111 formed by chamber walls 112 extending about the lower cantilever arm 72 of the carriage system. The chamber 111 is tapped at a point 113 and an outlet nozzle 114 with an associated valve 115 is mounted thereto to permit effective draining of the tank 99.

During the progression of the tapered electrodes 81 within the grooves 32 of the associated rolls it may be desirable for a variety of mechanical reasons to hold the position of the carriage system. Also, it may be desirable for locking the carriage assembly in an elevated orientation in the absence of fluid pressure within the hydraulic system.

To accomplish either of these objectives, a locking device is provided directly about the guide columns 65 and 66 and is best illustrated in FIGURE 14 of the drawings. In FIGURE 14 a chain or cable 116 is deployed about the column 65 within the guide cylinder 67. The cable 116 has a first end 117 locked within the guide cylinder 67 at a pair of sect screw ball joints 118 and 119. By turning the set screws 118 and 119 the balls 120 and 121 are forced to crimp-lock the cable end 117.

The opposite end of the cable 116 extends through a slot 122 formed within the cylindrical support 67 to a lug 123 securely clamped to the cable extremity. A locking arm 124 is pivotally supported to a bracket 125 at a point 126. The bracket 125 is rigidly supported to the cylindrical support 67, and the arm 124, when pivoted about the bracket 125, increases the tension on the cable 116 for grasping or clamping the guide column 65. To accomplish this tensioning of the cable 116 a lever 127 is utilized in conjunction with an eccentric cam 128. In particular, the cam 128 is rotatably positioned about the extremity of the arm 124 at a point 129 and is provided to ride against the outer surface of the cylindrical support 67 at a point 130. By movement of the lever 127 the distance between the pivot 129 and the outer surface of the support cylinder 67 can be varied due to the eccentric nature of the cam 128. This corresponds to a pivotal movement of the locking arm 124 and, hence, to a tensioning of the cable 116.

*Method of forming the tube reducing tool*

With regard to the method, it will be appreciated that the blank 20 is formed of a single piece of forged steel having the roll portion 21 and the drive shaft portion 22 which extends at opposite ends of the roll portion. The blank is then further processed or machined to form the rolls or roll blanks 23, 24, 25 and the grooves 32 are rough machined therein.

The relief pockets 27 and the keyways 38 are then formed in the grooves 32 and in the drive shaft portion 22 and the drive shaft portion is machined to form a series of decreasing diameters 33, 34, 35 and 36. The tool is then heat treated into a hardened state. The order of the steps up to the heat treating step can be varied as required.

The tool is then positioned in adjacency to the tapered electrodes such as the electrode 81 in such a way that the electrodes are aligned with the grooves 32. Relative movement is then brought about between the electrode and the roll blanks and an electric spark is caused to be discharged by the electrodes to establish a cutting zone whereby the taper is burned into the grooves 32. During the burning operation, the cutting zone is immersed in oil. In the illustrated embodiment, the electrodes are caused to move tangentially of the grooves 32 in an upward direction so that machined particles can fall away from the cutting zone to minimize short circuits. The electrodes can be mounted in such a position as to be positioned over the grooves and then caused to move in a downward direction to machine the grooves, but better results are obtainable where the electrodes are positioned so as to underlie the grooves being machined.

After the grooves have been machined to impart the desired taper to them no further heat treatment is required and the grooves can then be polished to provide the desired micro-finish thereon.

It will be understood that various modifications may be suggested by the embodiments disclosed, but I desire to claim within the scope of the patent warranted hereon, all such modifications as come within the scope of my invention.

I claim as my invention:

1. A roll forming machine for tapering a series of sets of grooves with each set of grooves being formed integrally and coaxially with a shaft to form a series of tube reducing rolls on each shaft, comprising:
   a frame,
   a fluid bath tank on said frame,
   means for removably suspending the shafts in side-by-side relation with a series of rolls formed at successive intervals along the length of each shaft and with each roll of one shaft confronting an associated roll of the adjacent shaft whereby the rolls are arranged in pairs along the length of the said fluid bath tank, said carriage having a series of tapered electrodes disposed along the length thereof, the axis of said shafts being substantially parallel to the plane of said electrodes with each one of the electrodes being disposed between each pair of confronting rolls, a carriage and means for moving the same in a direction generally perpendicular to the axis of said shafts, means for moving said shafts and the rolls carried thereon in arcs while moving said tapered electrodes in said fluid bath tank between the pairs of rolls generally in a direction common to the direction of movement of said rolls, and means for electrical discharge machining the rolls during the movement of said electrodes and said rolls.

2. A roll forming machine for tapering a series of sets of grooves with each set of grooves being formed integrally with a shaft to form a series of tube reducing rolls on each shaft, comprising a frame, a fluid bath tank on said frame, a series of support rollers rotatably mounted on said frame, said shafts suspended on said support rollers in side-by-side relation with each roll on one of the shafts confronting an associated roll on the adjacent shaft whereby the rolls are arranged in pairs, means for axially positioning said shafts relative to said support rollers, a series of tapered electrodes disposed along the length of said shafts with one of the electrodes disposed between each pair of confronting rolls, a carriage with said electrodes mounted thereon in side-by-side relation, means for moving said shafts and the rolls carried thereon in arcs while moving said tapered electrodes in said fluid bath tank between the pairs of rolls generally in a direction common to the direction of movement of said rolls, and means for electrical discharge machining the rolls during the movement of said electrodes and said rolls.

3. A roll forming machine for tapering a series of sets of grooves with each set of grooves being formed integrally with a shaft to form a series of tube reducing rolls on each shaft, comprising a frame, a fluid bath tank disposed substantially centrally and longitudinally of said frame, a set of support rollers mounted on said frame at opposite ends of said fluid bath tank, each set of support rollers having first and second roller pairs disposed for receiving first and second of said shafts respectively and for maintaining said shafts in a predetermined axial correlation, each roller pair having first and second cylindrical rollers freely rotatably mounted longitudinally of said frame and having a spacing therebetween less than the diameter of said shaft supportable thereon, said shafts suspended on said support rollers in side-by-side relation with each roll on one of the shafts confronting an associated roll on the adjacent shaft whereby the rolls are arranged in pairs, a series of tapered electrodes disposed along the length of said shafts with one of the electrodes disposed between each pair of confronting rolls, a carriage with said electrodes mounted thereon in side-by-side relation, means for moving said shafts and the rolls carried thereon in arcs while moving said tapered electrodes in said fluid bath tank between the pairs of rolls generally in a direction common to the direction of movement of said rolls, and means for electrical discharge machining the rolls during the movement of said electrodes and said rolls.

4. A roll forming machine for tapering a series of grooves on rolls integral with a common shaft, comprising a frame, a fluid bath tank disposed substantially centrally of said frame, means for suspending the rolls and at least part of the shaft in said fluid bath tank, said fluid bath tank having a base and side walls mounted longitudinally of said shaft and having end walls disposed transversely of said shaft, said end walls having a shaft opening formed therein whereby said rolls are suspended within said fluid bath and said integral shaft is extended through said shaft openings for being supported and aligned externally of said fluid bath tank, removable seal plates having an outer peripheral configuration cooperable with said shaft opening and an inner diameter cooperable with an outer diameter of said shaft for providing a fluid tight seal between said tank and said relatively moving shaft, a series of tapered electrodes, a carriage with said electrodes mounted thereon in side-by-side relation, means for moving said shaft and said rolls in an arc in slightly spaced relation to one another while moving said tapered electrodes in said fluid bath tank generally in a direction common to said arc of movement, and maens for electrical discharge machining the rolls during the movement of said electrodes and said rolls.

5. A roll forming machine for tapering a series of sets of grooves with each set of grooves being formed integrally with a shaft to form a series of tube reducing rolls on each shaft, comprising a frame, a fluid bath tank disposed substantially centrally of said frame, means for suspending the shafts in side-by-side relation with each roll on one of the shafts confronting an associated roll on the adjacent shaft whereby the rolls are arranged in pairs, said rolls being suspended internally of said tank and said shaft having opposite ends extending externally thereof, said fluid bath tank having a base and side walls mounted longitudinally of said shafts and having end walls disposed transversely thereof, said end walls having shaft opening formed therein and receiving said shafts therethrough, a pair of removable seal plates disposed at each of said shaft openings and having an outer peripheral configuration cooperable with each other and with said associated shaft opening and each having an inner diameter cooperable with an outer diameter of one of said shafts for providing a fluid tight seal between said tank and said relatively moving shafts, a series of tapered electrodes disposed along the length of said shafts with one of the electrodes disposed between each pair of confronting rolls, a carriage with said electrodes mounted thereon in side-by-side relation, means for moving said shafts and the rolls carried thereon in arcs while moving said tapered electrodes in said fluid bath tank between the pairs of rolls generally in a direction common to the direction of said rolls, and means for electrical discharge machining the rolls during the movement of said electrodes and said rolls.

6. A roll forming machine as described in claim 5 wherein said removable seal plates comprise octagonal rings fixedly mounted to said end walls of said fluid tank, fitted about a cooperable diameter of said shafts, and secured to each other at an innermost octagonal edge for providing a fluid type seal between said tank and said relatively movable shafts.

7. A roll forming machine for tapering a series of sets of grooves with each set of grooves being formed integrally with a shaft to form a series of tube reducing rolls on each shaft, comprising
a frame,
a fluid bath tank disposed substantially centrally and longitudinally of said frame,
a set of support rollers mounted on said frame at opposite ends of said fluid bath tank,
each set of support rollers having first and second roller pairs disposed for receiving first and second of said shafts respectively and for maintaining said shafts in a predetermined axial correlation,
said shafts suspended on said support rollers in side-by-side relation with each roll on one of the shafts confronting an associated roll on the adjacent shaft whereby the rolls are arranged in pairs,
said fluid bath tank having a shaft opening formed therein whereby said rolls are suspended within said fluid bath and said integral shaft is extended through said shaft openings,
removable seal plates cooperable with said tank and said shaft for providing a fluid seal therebetween,
a series of tapered electrodes disposed along the length of said shafts with one of the electrodes disposed between each pair of confronting rolls,
a carriage with said electrodes mounted thereon in side-by-side relation,
means for moving said shafts and the rolls carried thereon in arcs while moving said tapered electrodes in said fluid bath tank between the pairs of rolls generally in a direction common to the direction of movement of said rolls, and means for electrical discharge machining the rolls during the movement of said electrodes and said rolls.

8. A roll forming machine for tapering a series of grooves on rolls integral with a common shaft, comprising
a frame,
a fluid bath tank on said frame,
means for suspending the rolls and at least part of the shaft in said fluid bath tank,
a series of tapered electrodes,
a carriage with said electrodes mounted thereon in side-by-side relation,
means for moving said shaft and said rolls in an arc in slightly spaced relation to one another while moving said tapered electrodes in said fluid tank bath generally in a direction common to said arc of movement,
means for direct locking said carriage and restraining movement thereof, and
means for electrical discharge machining the rolls during the movement of said electrodes and said rolls.

9. A roll forming machine for tapering a series of grooves on rolls integral with a common shaft, comprising
a frame,
a fluid bath tank on said frame,
means for suspending the rolls and at least part of the shaft in said fluid bath tank,
a series of tapered electrodes,
a carriage with said electrodes mounted thereon in side-by-side relation,
said carriage having a support column being relatively extensible supported on said frame,
a locking cable having a first end fixedly secured at said frame, a center portion wrapped about said relatively extensible column, and a second end affixed to a locking arm,
said locking arm having a first end pivotally mounted at said frame and having an eccentric cam at a second end thereof rotatable against said frame for altering the pivotal relationship of said arm and said frame,
said locking cable being tensioned about said support column by actuation of said eccentric cam and extensible movement of said support column being restricted by tensioning of said locking cable,
means for moving said shaft and said rolls in an arc in slightly spaced relation to one another while moving said tapered electrodes in said fluid bath tank generally in a direction common to said arc of movement, and means for electrical discharge machining the rolls during the movement of said electrodes and said rolls.

10. A roll forming machine for tapering a series of sets of grooves with each set of grooves being formed integrally with a shaft to form a series of tube reducing rolls on each shaft, comprising
a frame,
a fluid bath tank on said frame,
means for suspending the shafts in side-by-side relation with each roll on one of the shafts confronting an associated roll on the adjacent shaft whereby the rolls are arranged in pairs,
a series of tapered electrodes disposed along the length of said shafts with one of the electrodes disposed between each pair of confronting rolls,
a carriage with said electrodes mounted thereon in side-by-side relation,
first and second cylindrical housings secured vertically of said frame,
said carriage having a support column relatively extensible from each of said cylindrical housings,
locking cables each having a first end fixedly secured within a wall of one of said cylindrical housings,
each of said locking cables having a center portion wrapped about an associated extensible column and having a second end affixed to a locking arm,
said locking arm having a first end pivotally mounted at an associated cylindrical housing and having an eccentric cam at a second end thereof rotatable against said housing for altering the pivotal relationship of said arm and said housing,
said locking cable being tensioned about said support column by actuation of said eccentric cam and extensible movement of said support column being restricted by tensioning of said locking cable,
means for moving said shafts and the rolls carried thereon in arcs while moving said tapered electrodes in said fluid bath tank between the pairs of rolls generally in a direction common to the direction of movement of said rolls, and
means for electrical discharge machining the rolls during the movement of said electrodes and said rolls.

11. In a roll forming machine as described in claim 10 wherein said carriage is elevated relative to said frame by a hydraulic type mechanism and wherein said locking cable tensioned about said support column exerts a force for opposing the hydraulic drive of said hydraulic type mechanism.

12. A roll forming machine for tapering a series of sets of grooves with each set of grooves being formed integrally with a shaft to form a series of tube reducing rolls on each shaft, comprising
a frame,
a fluid bath tank on said frame,
a series of support rollers rotatably mounted on said frame,
said shafts suspended on said support rollers in side-by-side relation with each roll on one of the shafts confronting an associated roll on the adjacent shaft whereby the rolls are arranged in pairs,
a series of tapered electrodes disposed along the length of said shafts with one of the electrodes disposed between each pair of confronting rolls,
a carriage with said electrodes mounted thereon in side-by-side relation, said carriage having a support column being relatively extensibly supported on said frame,
a locking cable having a first end fixedly secured at said frame, a center portion wrapped about said relatively extensible column and a second end affixed to a locking arm,
  said locking arm having a first end pivotally mounted at said frame and having an eccentric cam at a second end thereof rotatable against said frame for altering the pivotal relationship of said arm and said frame,
  said locking cable being tensioned about said support column by actuation of said eccentric cam and extensible movement of said support column being restricted by tensioning of said locking cable,
means for moving said shafts and the rolls carried thereon in arcs while moving said tapered electrodes in said fluid bath tank between the pairs of rolls generally in a direction common to the direction of movement of said rolls, and
means for electrical discharge machining the rolls during the movement of said electrodes and said rolls.

13. A roll forming machine for tapering a series of sets of grooves with each set of grooves being formed integrally with a shaft to form a series of tube reducing rolls on each shaft, comprising
a frame,
a fluid bath tank disposed substantially centrally of said frame,
  said fluid bath tank having a shaft opening formed therein whereby said rolls are suspended within said fluid bath and said integral shaft is extended through said shaft openings,
removable seal plates cooperable with said tank and said shaft for providing a fluid seal therebetween,
a set of support rollers mounted on said frame at opposite ends of said fluid bath tank,
  said shafts suspended on said support rollers in side-by-side relation with each roll on one of the shafts confronting an associated roll on the adjacent shaft whereby the rolls are arranged in pairs,
a series of tapered electrodes disposed along the length of said shafts with one of the electrodes disposed between each pair of confronting rolls,
a carriage with said electrodes mounted thereon in side-by-side relation,
means for direct locking said carriage and restraining movement thereof,
means for moving said shafts and the rolls carried thereon in arcs while moving said tapered electrodes in said fluid bath tank between the pairs of rolls generally in a direction common to the direction of movement of said rolls, and
means for electrical discharge machining the rolls during the movement of said electrodes and said rolls.

14. A roll forming machine for tapering a series of grooves on rolls integral with a common shaft, comprising
a frame,
a fluid bath tank on said frame,
means for suspending the rolls and at least part of the shaft in said fluid bath tank,
a series of tapered electrodes,
a carriage with said electrodes mounted thereon in side-by-side relation,
means for moving said carriage in a vertical path relative to said frame,
a gear rack mounted at said carriage and being vertically translated thereby,
a pinion gear rotatably mounted at said frame and being meshed with said gear rack,
a ring gear rigidly disposed about said shaft and being cooperable with said pinion gear for rotating said shaft contemporaneously with the vertical movement of said carriage,
  said ring gear moving said shaft and said rolls in an arc in slightly spaced relation to one another while moving said tapered electrodes in said fluid bath tank generally in a direction common to said arc of movement, and
means for electrical discharge machining the rolls during the movement of said electrodes and said rolls.

15. A roll forming machine for tapering a series of grooves on rolls integral with a common shaft, comprising
a frame,
a fluid bath tank on said frame,
means for suspending the rolls and at least part of the shaft in said fluid bath tank,
a series of tapered electrodes,
a carriage with said electrodes mounted thereon in side-by-side relation,
means for moving said carriage in a vertical path relative to said frame,
a gear rack mounted at said carriage and being vertically translated thereby,
a pinion gear rotatably mounted at said frame and being meshed with said gear rack,
a ring gear fitted about said shaft and having a split ring fixedly secured thereto,
means for constricting said split ring about said shaft and thereby securing said ring gear thereabout,
  said ring gear being cooperable with said pinion gear for rotating said shaft contemporaneously with the vertical movement of said carriage,
  said ring gear moving said shaft and said rolls in an arc in slightly spaced relation to one another while moving said tapered electrodes in said fluid bath tank generally in a direction common to said arc of movement, and
means for electrical discharge machining the rolls during the movement of said electrodes and said rolls.

16. A roll forming machine as described in claim 15 wherein said split ring is adjustably tightened about said shaft and wherein said ring gear abuts said split ring and is bolted thereto for providing a stationary relationship between said shaft and said ring gear.

17. A roll forming machine for tapering a series of sets of grooves with each set of grooves being formed integrally with a shaft to form a series of tube reducing rolls on each shaft, comprising
a frame,
a fluid bath tank disposed substantially centrally and longitudinally of said frame,
a set of support rollers mounted on said frame at opposite ends of said fluid bath tank,
  said shafts suspended on said support rollers in side-by-side relation with each roll on one of the shafts confronting an associated roll on the adjacent shaft whereby the rolls are arranged in pairs,
a series of tapered electrodes disposed along the length of said shafts with one of the electrodes disposed between each pair of confronting rolls,
a carriage with said electrodes mounted thereon in side-by-side relation,
a ring gear fitted about said shaft and having a split ring fixedly secured thereto,
means for constricting said split ring about said shaft and thereby securing said ring gear thereabout,
  said ring gear being driven for moving said shafts and the rolls, carried thereon in arcs while moving said tapered electrodes in said fluid bath tank between the pairs of rolls generally in a direction common to the direction of movement of said rolls, and
means for electrical discharge machining the rolls during the movement of said electrodes and said rolls.

18. A roll forming machine for tapering a series of sets of grooves with each set of grooves being formed integrally with a shaft to form a series of tube reducing rolls on each shaft, comprising a frame, a fluid bath tank disposed substantially centrally of said frame, means for suspending the shafts in side-by-side relation with each roll on one of the shafts confronting an associated roll on the adjacent shaft whereby the rolls are arranged in pairs, said fluid bath tank having a shaft opening formed therein whereby said rolls are suspended within said fluid bath and said integral shaft is extended through said shaft openings, removable seal plates cooperable with said tank and said shaft for providing a fluid seal therebetween, a series of tapered electrodes disposed along the length of said shafts with one of the electrodes disposed between each pair of confronting rolls, a carriage with said electrodes mounted thereon in side-by-side relation, a ring gear fitted about said shaft and having a split ring fixedly secured thereto, means for constricting said split ring about said shaft and thereby securing said ring gear thereabout, said ring gear being driven for moving said shafts and the rolls carried thereon in arcs while moving said tapered electrodes in said fluid bath tank between the pairs of rolls generally in a direction common to the direction of movement of said rolls, and means for electrical discharge machining the rolls during the movement of said electrodes and said rolls.

19. A roll forming machine for tapering a series of sets of grooves with each set of grooves being formed integrally with a shaft to form a series of tube reducing rolls on each shaft, comprising a fluid bath tank disposed substantially centrally and longitudinally of said frame, a set of support rollers mounted on said frame at opposite ends of said fluid bath tank, said shafts suspended on said support rollers in side-by-side relation with each roll on one of the shafts confronting an associated roll on the adjacent shaft whereby the rolls are arranged in pairs, said fluid bath tank having a shaft opening formed therein whereby said rolls are suspended within said fluid bath and said integral shaft is extended through said shaft openings, removable seal plates cooperable with said tank and said shaft for providing a fluid seal therebetween, a series of tapered electrodes disposed along the length of said shafts with one of the electrodes disposed between each pair of confronting rolls, a carriage with said electrodes mounted thereon in side-by-side relation, means for direct locking said carriage and restraining movement thereof, a ring gear fitted about said shaft and having a split ring fixedly secured thereto, means for constricting said split ring about said shaft and thereby securing said ring gear thereabout, said ring gear being driven for moving said shafts and the rolls carried thereon in arcs while moving said tapered electrodes in said fluid bath tank between the pairs of rolls generally in a direction common to the direction of movement of said rolls, and means for electrical discharge machining the rolls during the movement of said electrodes and said rolls.

References Cited

UNITED STATES PATENTS

| | | | |
|---|---|---|---|
| 782,024 | 2/1905 | Heise | 308—203 X |
| 2,155,392 | 4/1939 | Ballard | 204—25 X |
| 2,739,935 | 3/1956 | Kehl et al. | |
| 2,938,104 | 5/1960 | Paillarse. | |
| 3,148,446 | 9/1964 | Celovsky. | |
| 3,251,762 | 5/1966 | Gordon | 204—143 X |

RICHARD M. WOOD, *Primary Examiner.*

R. F. STAUBLY, *Assistant Examiner.*

U.S. Cl. X.R.

308—203